（12）United States Patent
Harris et al.

(10) Patent No.: US 10,818,987 B2
(45) Date of Patent: Oct. 27, 2020

(54) BATTERY CELL WITH INTEGRATED VAPOR CHAMBER

(71) Applicant: ROMEO SYSTEMS INC., Vernon, CA (US)

(72) Inventors: W. Porter Harris, Pasadena, CA (US); William Hunter Greene, Vernon, CA (US); Qian Wang, Vernon, CA (US); Wesley Thibault, Vernon, CA (US); Berton Vite, Vernon, CA (US)

(73) Assignee: Romeo Systems Technology, LLC, Vernon, CA (US)

( * ) Notice: Subject to any disclaimer, the term of this patent is extended or adjusted under 35 U.S.C. 154(b) by 106 days.

(21) Appl. No.: 15/847,505

(22) Filed: Dec. 19, 2017

(65) Prior Publication Data

US 2018/0183118 A1 Jun. 28, 2018

Related U.S. Application Data

(60) Provisional application No. 62/438,366, filed on Dec. 22, 2016.

(51) Int. Cl.
*H01M 10/00* (2006.01)
*H01M 10/6551* (2014.01)
(Continued)

(52) U.S. Cl.
CPC ... *H01M 10/6551* (2015.04); *H01M 8/04059* (2013.01); *H01M 10/625* (2015.04);
(Continued)

(58) Field of Classification Search
CPC ........... H01M 10/6551; H01M 10/625; H01M 10/643; A24F 47/008; A24F 7/02; A24F 21/00; Y02T 90/32
See application file for complete search history.

(56) References Cited

U.S. PATENT DOCUMENTS 8,852,772 B2 10/2014 McDonald
9,510,623 B2 * 12/2016 Tucker ................. H01C 17/00
(Continued)

FOREIGN PATENT DOCUMENTS

CN   105990620   10/2016
DE   4102532     6/1992
(Continued)

OTHER PUBLICATIONS

PCT; International Search Report and Written Opinion in the International Application No. PCT/US2017/062253 dated May 9, 2018.
(Continued)

*Primary Examiner* — Cynthia H Kelly
*Assistant Examiner* — Monique M Wills
(74) *Attorney, Agent, or Firm* — Snell & Wilmer L.L.P.

(57) ABSTRACT

A battery cell is made more thermally efficient with the addition of an integrated vapor chamber that extends out from the cell and into an external heat exchange interface. The integrated vapor chamber can contain a working fluid which undergoes phase changes between liquid and vapor phases when there is a temperature differential between the interior and exterior of the cell. The integrated vapor chamber can include a wicking material to transfer the working fluid to the exterior wall of the vapor chamber. The integrated vapor chamber allows for both heating and cooling of the battery cell.

19 Claims, 7 Drawing Sheets

(51) Int. Cl.
    *H01M 10/625*     (2014.01)
    *H01M 10/643*     (2014.01)
    *H01M 10/654*     (2014.01)
    *H01M 10/6569*     (2014.01)
    *H01M 8/04007*     (2016.01)
    *H01M 10/6552*     (2014.01)

(52) U.S. Cl.
    CPC ....... *H01M 10/643* (2015.04); *H01M 10/654* (2015.04); *H01M 10/6552* (2015.04); *H01M 10/6569* (2015.04); *H01M 2220/20* (2013.01); *H01M 2250/20* (2013.01); *Y02T 90/32* (2013.01)

(56) References Cited

U.S. PATENT DOCUMENTS

| | | |
|---|---|---|
| 9,865,907 B2 | 1/2018 | Xiang |
| 2012/0164492 A1 | 6/2012 | Lachenmeier |
| 2013/0130074 A1 | 5/2013 | Timmons |
| 2014/0335381 A1 | 11/2014 | Krolak |
| 2015/0280295 A1 | 10/2015 | Bhunia et al. |
| 2016/0104925 A1 | 4/2016 | Xiang |
| 2017/0352935 A1 | 12/2017 | Perdu |
| 2018/0083330 A1 | 3/2018 | Xiang |
| 2019/0037928 A1* | 2/2019 | Fornarelli ............ A24F 47/008 |

FOREIGN PATENT DOCUMENTS

| | | |
|---|---|---|
| EP | 3018732 A1 | 5/2016 |
| FR | 3030121 a1 | 6/2016 |
| JP | 2000260474 A | 9/2000 |

OTHER PUBLICATIONS

PCT; International Preliminary Report on Patentability in the International Application No. PCT/US2017/062253 dated May 21, 2019.
PCT; Written Opinion and Search Report dated May 24, 2018 in PCT Application No. PCT/US2017/067395.
USPTO; Restriction Requirement in the U.S. Appl. No. 15/815,975 dated Jun. 1, 2020.
EP; Extended European Search Report in the EP Application No. 17871285.7 dated May 19, 2020.

* cited by examiner

BATTERY CELL WITH INTEGRATED VAPOR CHAMBER

CROSS REFERENCE TO RELATED APPLICATIONS

The present application claims priority to U.S. Provisional Patent Application No. 62/438,366, filed on Dec. 22, 2016, which is herein incorporated by reference, in its entirety.

BACKGROUND

For multi-cell batteries, battery configuration, and assembly, for example, battery packs used in vehicles, rapid cooling is crucial to eliminate failure modes such as thermal runaway due to large amounts of heat generation, and keeping cells at an average temperature to maintain an optimal cycle life. Additionally, in conditions where excessive cold limits battery efficiency and discharging capability, fast preheating is required to improve driving range and cycle life. Therefore, optimal heat transfer rates are necessary.

Commonly used battery cooling/heating methods heat and cool battery cells by placing the cells in contact with a heat exchanger interface, such as a heat pump thermal interface. However, these systems have the following disadvantages:

1) A limitation of electrical energy discharge and charge rates due to limitation of heat transfer out of or into the cell.

2) Battery cells inherently generate heat during electrical charging and discharging due to Joule heating effects (internal electrical resistance), chemical reaction heating, and exothermic chemical reactions. This heating can cause dangerous temperature rise and therefore cell failure if discharge and charge rates are not carefully controlled. Therefore, limitations on rates of charge and discharge are directly related to the cells temperature. When the cell temperature drops too low, cell performance also suffers due to lack of activation energy for the electro-chemical reactions, low electrolyte conductivity, and slow diffusion of charge.

3) The current state of technology for Li battery cells with additional cooling devices limits the battery module/pack power density. Indirect cooling is insufficient to maintain desirable working temperature range for high power density battery module/pack and under high C-rate operation.

4) There are limitations in satisfying variable battery platforms and arrangements.

SUMMARY

A novel design for direct battery cell cooling and preheating is provided using a wicked heat pipe (vapor chamber) inserted into the hollow core of the jelly roll of the secondary battery cell and extended outward to be placed in contact with a heat exchange interface, such as a thermal exchange fluid, to efficiently transfer heat away from (cooling) or into (heating) the cell.

According to a first aspect of the invention, a battery cell is described, comprising: a cell body; and a vapor chamber embedded in the cell body.

DETAILED DESCRIPTION

Figure 1:
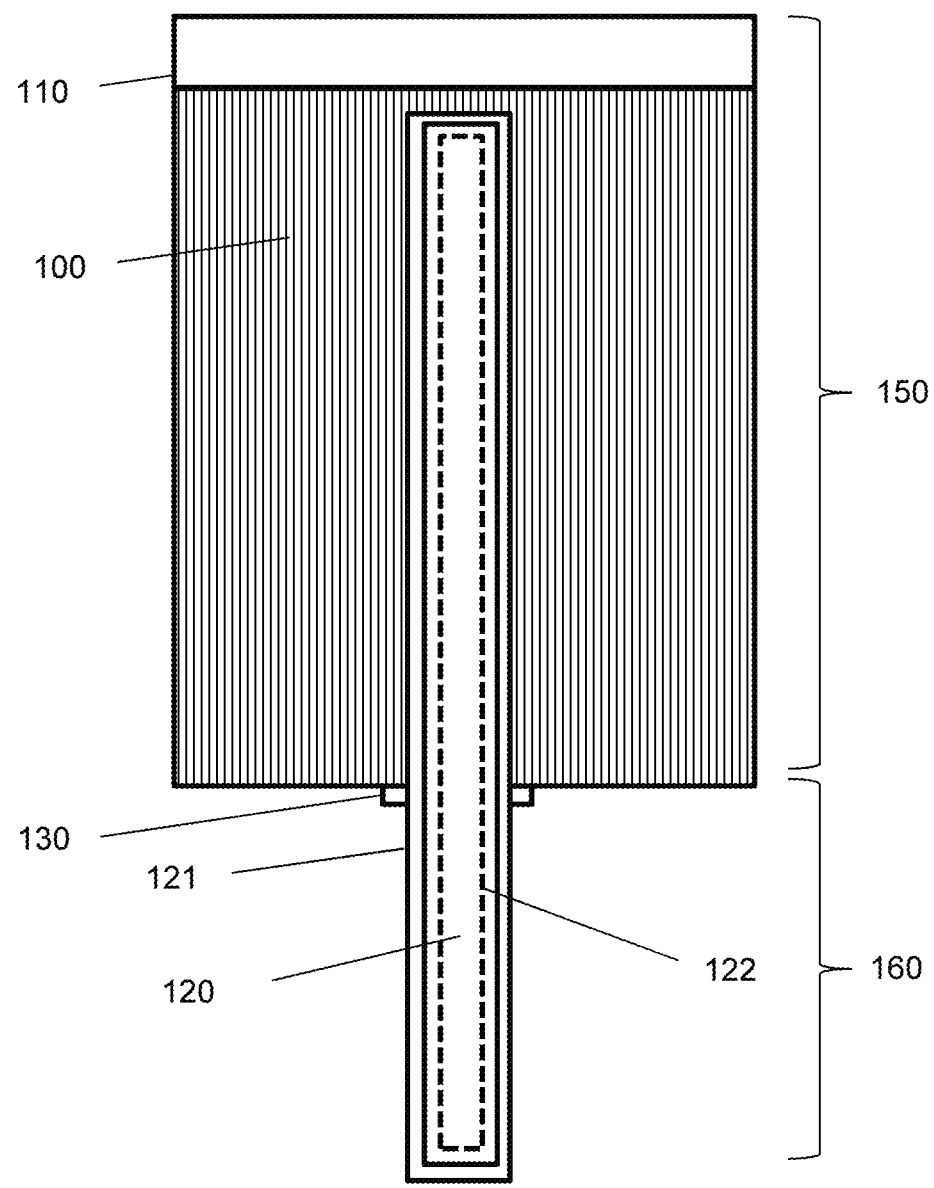
FIG. 1 shows an example cross-section of a battery cell with an integrated vapor chamber.

An improvement to the battery cell can be achieved by integrating a vapor chamber containing a working fluid (phase-change fluid) and a wicking structure into the cell body, creating a heat pipe between the interior of the cell and the exterior of the cell. In one embodiment, a heat pipe device is integrated into the cell casing, positioned axially and at the center of the battery cell casing, and extending outward so as to provide a means of transferring heat energy away from or into the interior of the cell.

When heat energy is applied to the heat pipe device, the liquid undergoes phase change to vapor (evaporation) as it absorbs the applied heat. The vapor will then move into the condensation section of the heat pipe where it undergoes condensation to a liquid phase and releases heat.

Vapor flow proceeds from the evaporation section to condensation section by means of a pressure differential in the saturated vapor and requires no external or additional force. The liquid working fluid flows to the evaporation section by means of gravity or capillary action by means of a wick or wicking material along the inner walls of the heat pipe. Capillary action provided by the wick ensures heat pipe functionality independent of the cells physical spatial orientation.

The process is reversible, allowing heat to flow into or out of the cell, depending on the temperature differential between the interior of the cell and the portion of the heat pipe device exterior to the cell (the stem).

A "battery pack" as used herein describes a set of any number of battery cells, interconnected in series or parallel or a combination of series and parallel, to provide energy storage and electric power to a system as a single integrated unit. An example of a battery pack would be an electric vehicle lithium ion battery which can consist of thousands of cylindrical lithium ion battery cells.

A "battery cell" as used herein describes an electrochemical cell that is capable of generating electrical energy from a chemical reaction. Some battery cells can be rechargeable by introducing a current through the cell. Battery cells come in different types, such as lead-acid, nickel cadmium, nickel hydrogen, nickel metal hydride, lithium ion, chloroaluminate sodium, based on the electrochemical reaction used to generate the electric current. Because battery cells produce electricity based on a chemical reaction, the temperature of the cell can influence the efficiency at which the electricity is produced. Battery cells can also be fuel cells, such as hydrogen-oxide proton exchange membrane cells, phosphoric acid cells, or solid acid cells.

A "heat pump" as used herein describes a system that moves thermal energy from one part of a system, known as a "heat source" to another part of the system, known as the "heat sink", by the application of an external power source. Typically, the heat is transferred by the movement of a fluid cycling between the heat source and heat sink. Examples include reversible two-phase refrigerant systems and single phase ethylene-glycol systems.

A "vapor chamber" (or "heat pipe") as used herein describes a reversible (heating and cooling) system that efficiently brings two solid interfaces (surfaces) into thermal equilibrium by thermal conductivity and phase transition of a working fluid (liquid in one phase, vapor in another) that traverses back and forth from one interface to the other.

"Axial cooling" as used herein describes cooling delivered externally from a system, for example a heat pump driven external heat exchanger connected to the system. While the name is derived from the idea of cooling/heating lines along an axis (in one side, out the other), the term as used herein is not limited to any particular flow directions (i.e. input and output can also be perpendicular, or at any angle, with respect to each other).

"Radial cooling" as used herein describes cooling of components of the system radially from the components to a surrounding cooling system that is thermally coupled to the radial cooling system. An example of radial cooling is an integrated vapor chamber within the system.

FIG. 1 shows an example cell with integrated vapor chamber. The cell can be described as including a body (150) and a stem (160). The body (150) can include an electrical connection cap (110) and spiral wound electrodes (100) (aka jelly-roll or swiss-roll construction of electrodes). The vapor chamber (120) can include a heat pipe wall (121) for conducting heat into and out of the vapor chamber (120), and a wicking structure (122) for transporting working fluid within the vapor chamber (120) when the fluid is in liquid phase. The wicking structure (122) can be constructed to include vapor channels to allow the movement of the working fluid when the fluid is in vapor phase. The vapor chamber (120) can be connected to the body (150) with a vapor-tight seal (130).

Figure 2A:
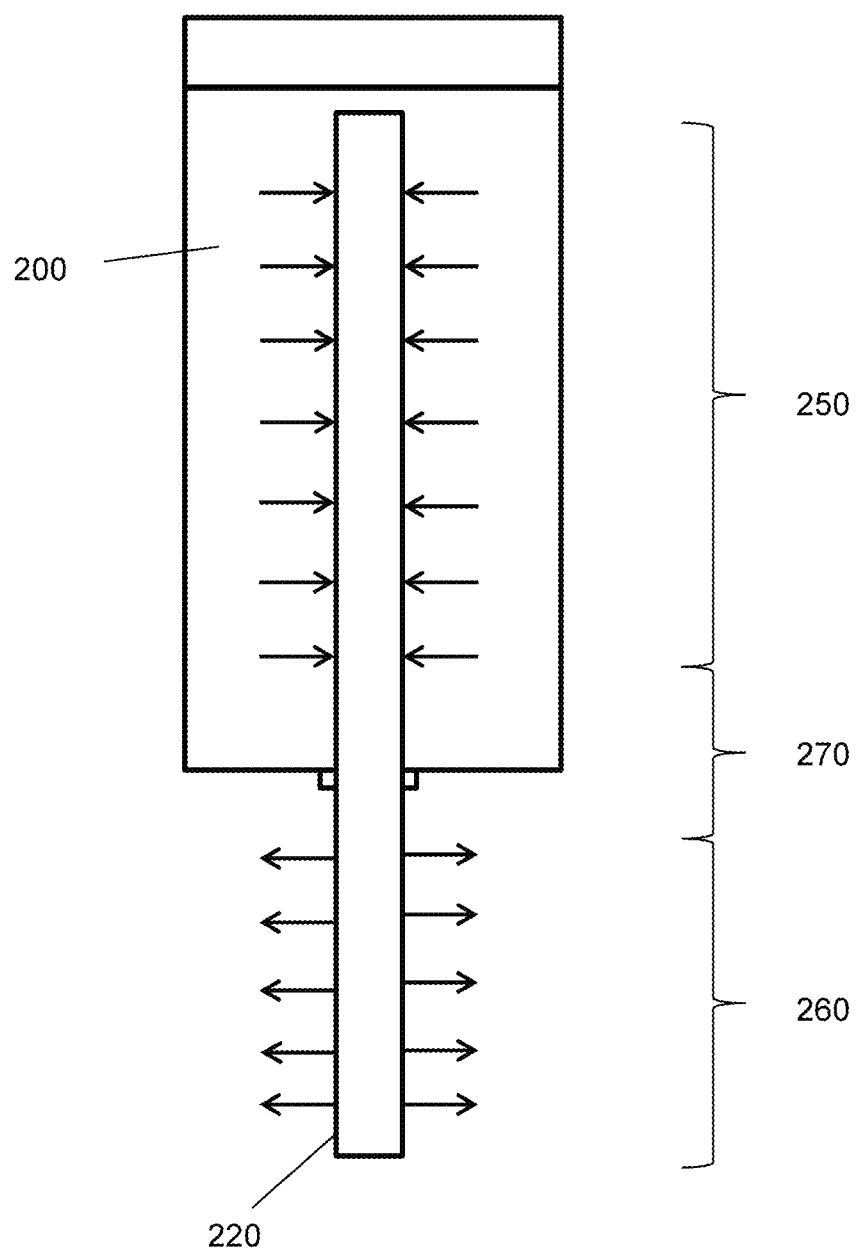
FIG. 2A shows an example cross-section of a battery cell with an integrated vapor chamber in cooling mode.

FIG. 2A shows an example of the cell of FIG. 1 in cooling mode. When the interior of the body (200) has a higher temperature than the exterior of the stem (220), the vapor chamber can be described as having an evaporation region (250) where the heat of cell (200) is absorbed by the vapor chamber and the working fluid evaporates from a liquid to a vapor, a condensation region (260) where the absorbed heat is radiated from the stem (220) into its surroundings (for example, a coolant bath or a heat sink) with the phase change of the working fluid from vapor to liquid, and an adiabatic region (270) between the other two regions.

Figure 2B:
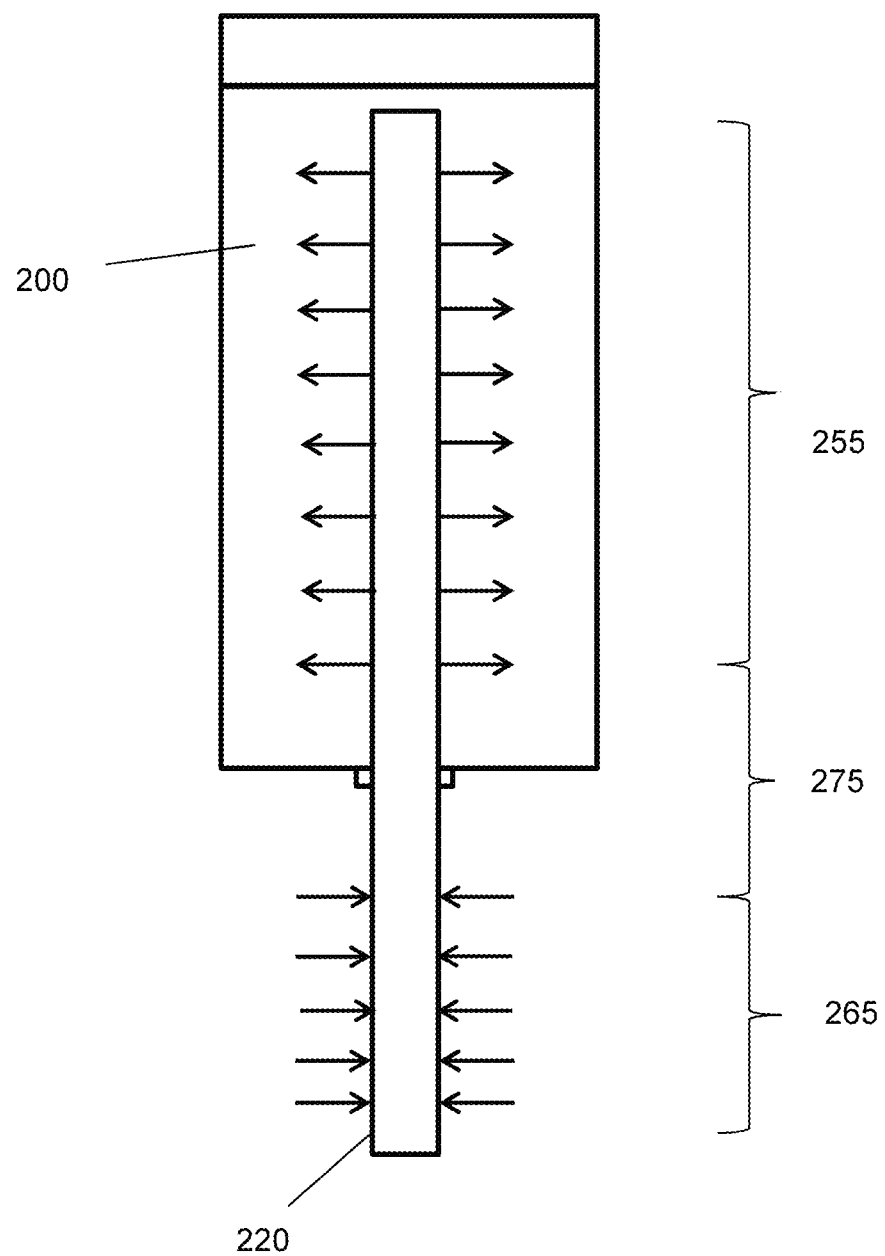
FIG. 2B shows an example cross-section of a battery cell with an integrated vapor chamber in heating mode.

FIG. 2B shows an example of the cell of FIG. 1 in heating mode. When heat is applied to the exterior of the stem (220), raising its temperature to be greater than the interior of the cell (200), the vapor chamber can be described as having an evaporation region (265) on the stem absorbing heat from an external source and having the working fluid in mainly a vapor phase, a condensation region (255) where the heat is released into the cell and the working fluid is in mainly a liquid phase, and an adiabatic region (275) between the other two regions.

Figure 3:
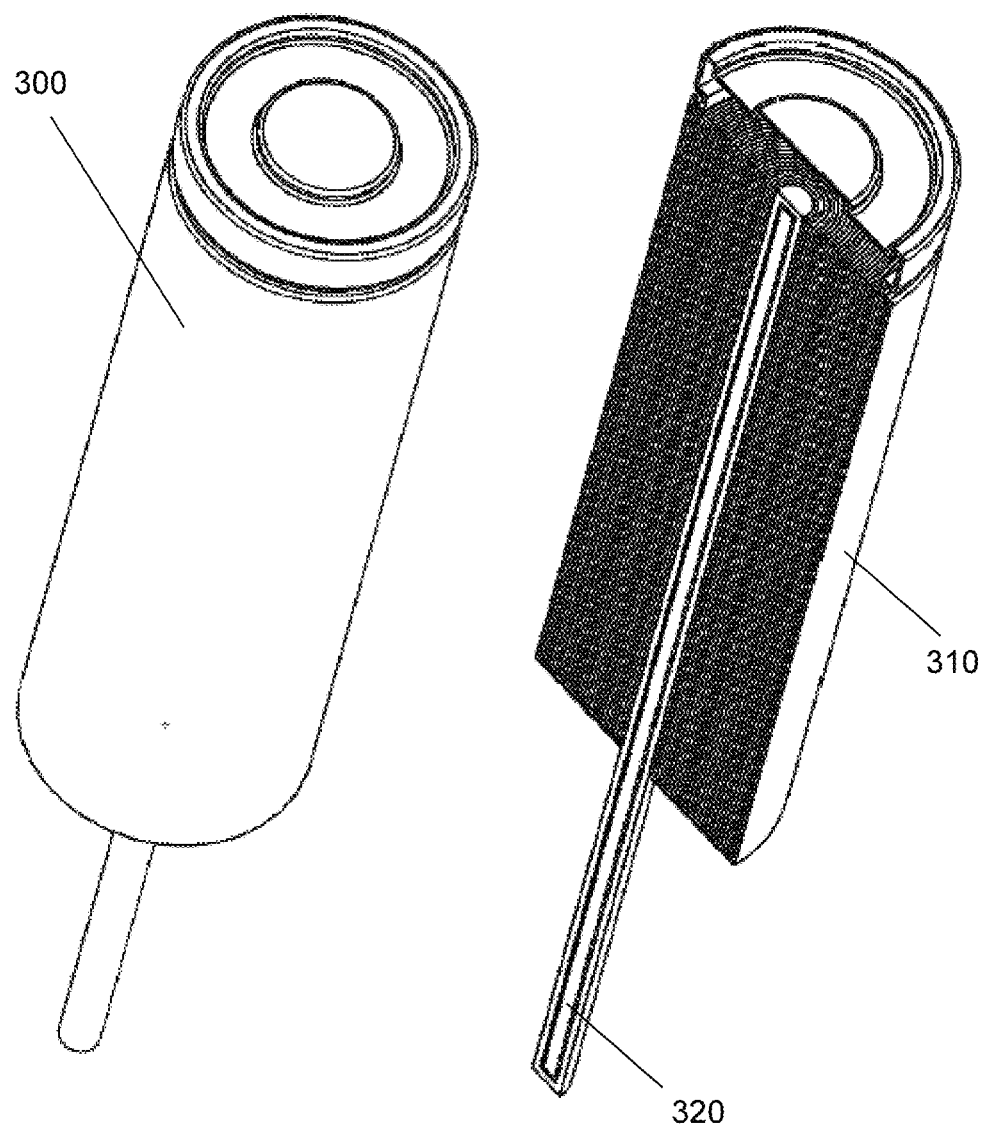
FIG. 3 shows an example battery cell with an integrated vapor chamber, exterior view and interior view.

FIG. 3 shows the exterior view (300) and interior (cross-sectional) view (310) of an example cell with integrated vapor chamber. Note that in this example, the wicking structure (320) extends the entire length of the vapor chamber. Other embodiments can include a wicking structure that does not extend the entire length of the vapor chamber: for example, a wicking structure that extends entirely within the body of the cell, but only partially in the stem of the cell.

Figure 4:
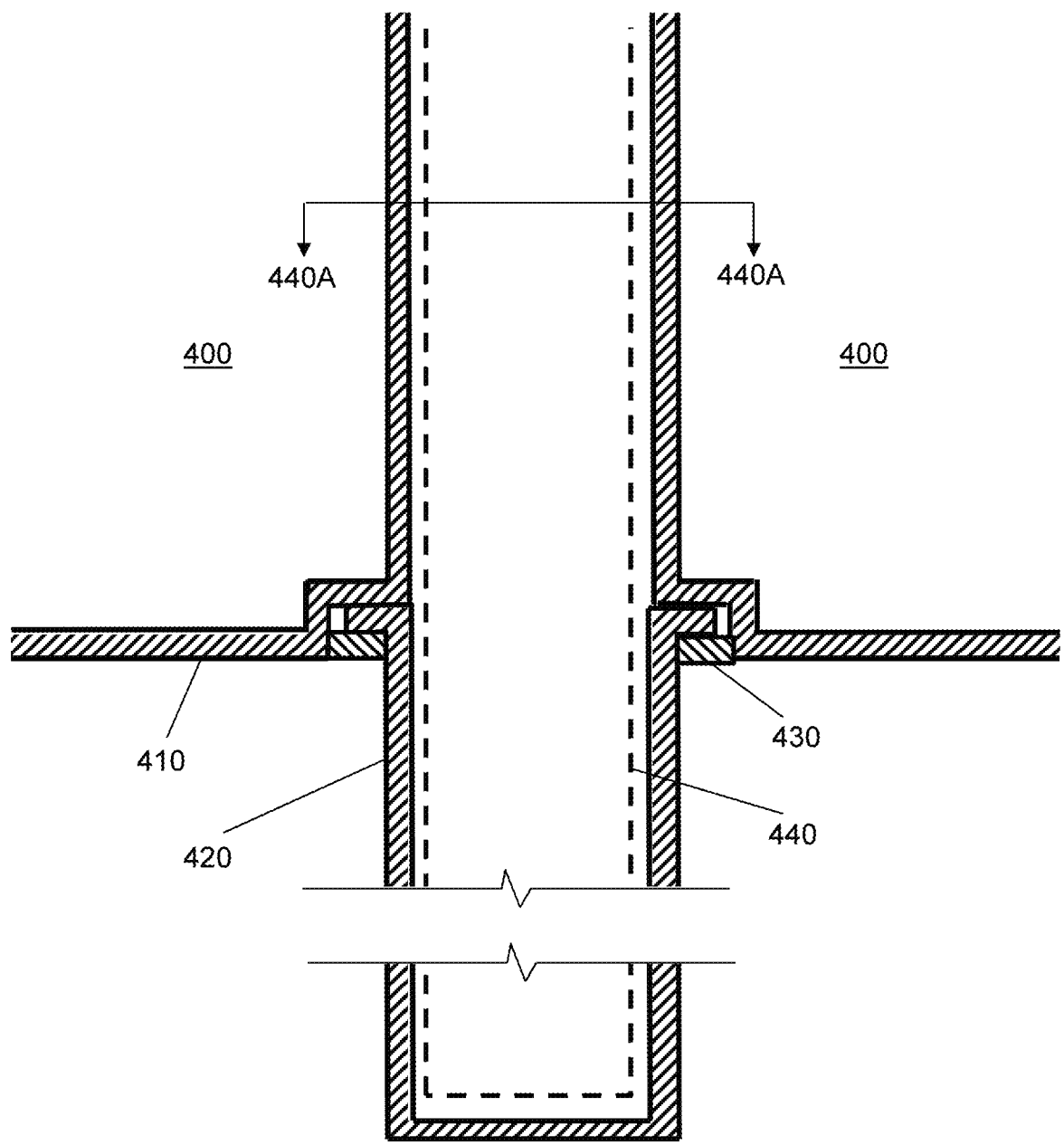
FIG. 4 shows an example sealed connection between a battery cell and an external heat dissipation rod.

FIG. 4 shows an example close up cross section of the connection between the stem (420) and body (400) of a cell with integrated vapor chamber. The shell (410) of the body can extend inward to form a vapor chamber, either by laser welding an interior pipe to the casing, or by a deep drawn process creating an interior pipe where the wicking structure (440) resides, or by similar means. The stem (420) can be attached to the body shell (410) with a seal (430) by laser welding, spot welding, spot brazing, or any other vapor-tight sealing process. The stem herein is shown as a rod shape as example, but other shapes can be used. Additionally, stem can include thermally conductive fins to increase the surface area for better thermal conduction.

Figure 5A:
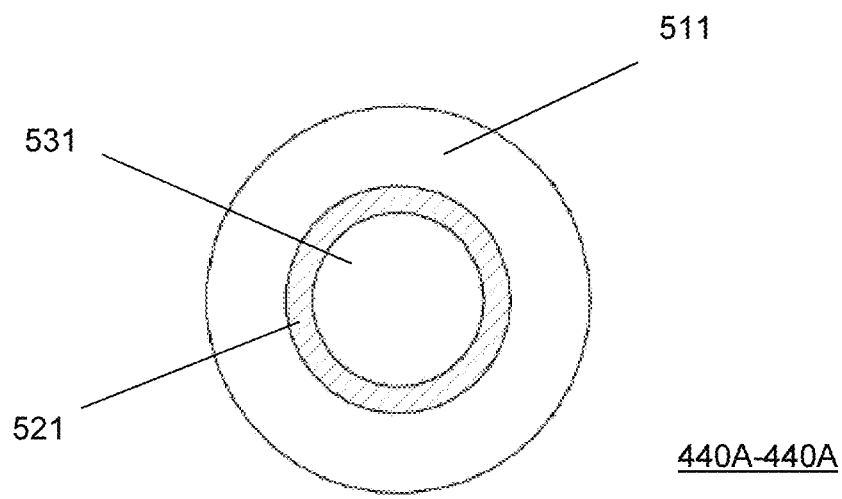
FIGS. 5A-5D show examples of wicking material configurations in the vapor chamber of an example battery cell with an integrated vapor chamber.
Figure 5B:
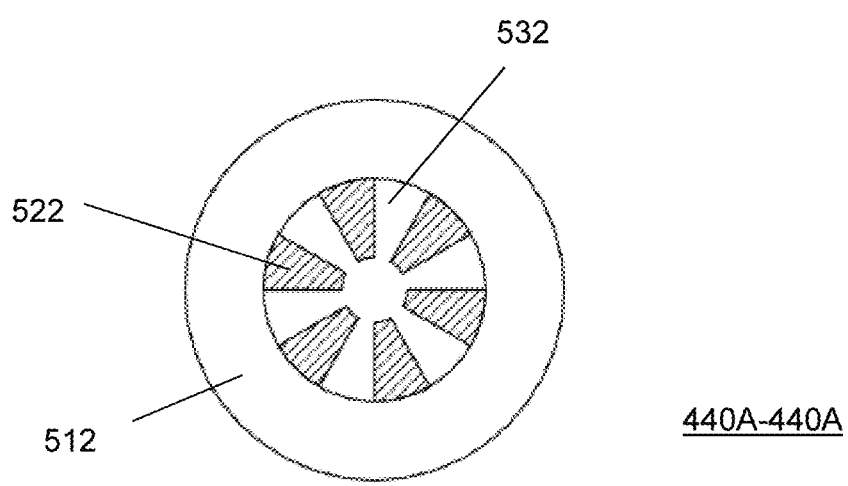
Figure 5C:
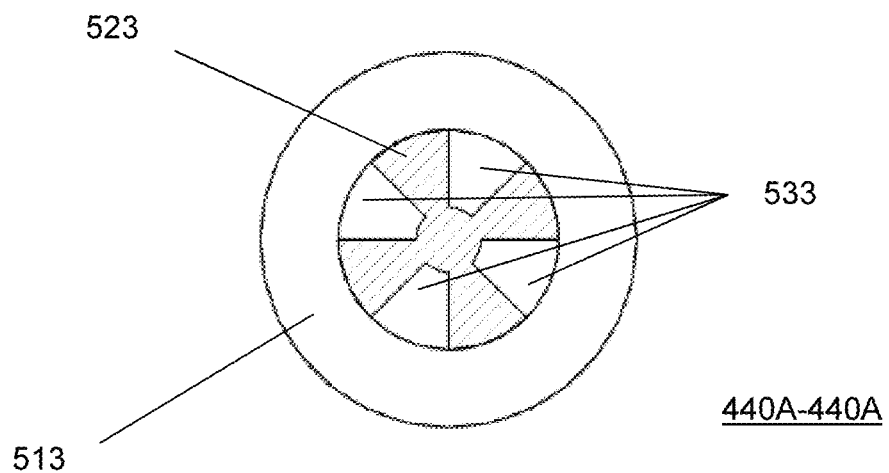
Figure 5D:
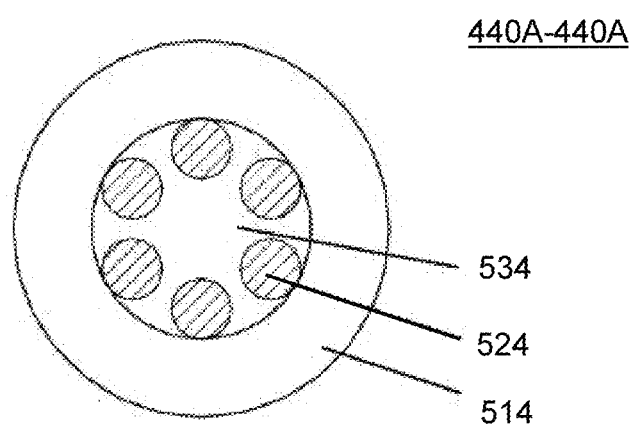

FIGS. 5A-5D show example wicking structure patterns, as a cross section (440A-440A) of the example cell shown in FIG. 4. In each, the heat pipe casing (511, 512, 513, 514) surrounds the wicking structure (521, 522, 523, 524) and at least one vapor channel (531, 532, 533, 534). FIG. 5A shows the wicking structure (511) as a layer connected to the casing (511) with a vapor chamber (531) in the center. FIG. 5B shows the wicking structure (522) as spoke-geometry strips. FIG. 5C shows the wicking structure (523) as spoke-geometry strips connected at the center, so that there are multiple vapor channels (533). FIG. 5D shows the wicking structure (524) as separate columns connected to the casing (514), either in a straight or spiraling pattern going up the vapor chamber.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A battery cell comprising:
   a cell body including a spiral wound electrode; and
   a vapor chamber at least partially embedded within the spiral wound electrode of the cell body, the vapor chamber configured to transfer heat between the interior of the cell body and a region external to the cell body; and
   a wicking structure within the vapor chamber.

2. The battery cell of claim 1, further comprising a stem extending from the battery cell comprising a portion of the vapor chamber.

3. The battery cell of claim 1, wherein the wicking structure comprises at least one of a wick or a wicking material.

4. The battery cell of claim 1, wherein the wicking structure extends an entire length of the vapor chamber.

5. The battery cell of claim 1, wherein the wicking structure includes at least one vapor channel.

6. The battery cell of claim 5, wherein the wicking structure has a ring-shaped cross section.

7. The battery cell of claim 5, wherein the wicking structure has a radial-spoked shaped cross section.

8. The battery cell of claim 5, wherein the wicking structure has a cross-shaped cross section.

9. The battery cell of claim 5, wherein the wicking structure comprises columns running along the vapor chamber.

10. The battery cell of claim 2, wherein the stem includes a seal to a casing of the cell body.

11. The battery cell of claim 1, wherein the vapor chamber includes a heat pipe casing formed from a heat pipe wall; wherein
the wicking structure comprises at least one vapor channel,
the vapor chamber is partially embedded in the cell body and partially extends out of the cell body, forming a stem,
the heat pipe casing is a heat conducting casing that surrounds and houses the wicking structure and extends inward of the cell body, and
the vapor chamber is connected to the cell body with a vapor-tight seal.

12. The battery cell of claim 11, wherein the cell body includes an electrical connection cap and spiral wound electrodes, and the vapor chamber includes a working fluid, capable of undergoing phase changes between liquid and vapor phases.

13. A method of heating the battery cell of claim 2, comprising: applying a heat source to the stem.

14. A method of cooling the battery cell of claim 2, comprising: placing the stem in contact with a substance at a lower temperature than an internal temperature of the cell body.

15. A method for transferring heat away from or into a battery cell, the battery cell having a cell body including a spiral wound electrode, a vapor chamber embedded in the cell body, and a wicking structure within the vapor chamber, the method comprising:
absorbing heat from the cell body, at an evaporation region of the vapor chamber, the vapor chamber at least partially embedded within the spiral wound electrode of the cell body, the vapor chamber configured to transfer heat between the interior of the cell body and a region external to the cell body;
evaporating a working fluid to a vapor by the absorbed heat within the evaporation region of the vapor chamber;
changing phase of the working fluid from liquid to vapor from evaporation thus taking away the heat, and making the vapor proceed from the evaporation region to a condensation region by means of a pressure difference;
changing phase of the working fluid from vapor to liquid at the condensation region where heat is released; and
making the liquid working fluid flow to the evaporation region by the capillary action provided by the wick.

16. The method of claim 15, wherein the absorbing occurs in the interior of the cell body.

17. The method of claim 15, wherein the condensation occurs from a stem extending from the battery cell comprising a portion of the vapor chamber.

18. The method of claim 15, wherein the absorbing occurs at a stem extending from the battery cell comprising a portion of the vapor chamber.

19. The method of claim 15, wherein the condensation occurs in the interior of the cell body.

* * * * *